Jan. 9, 1940.  H. E. SLOAN ET AL  2,186,504
CHUCK OPERATING MECHANISM
Filed April 12, 1938  3 Sheets-Sheet 1
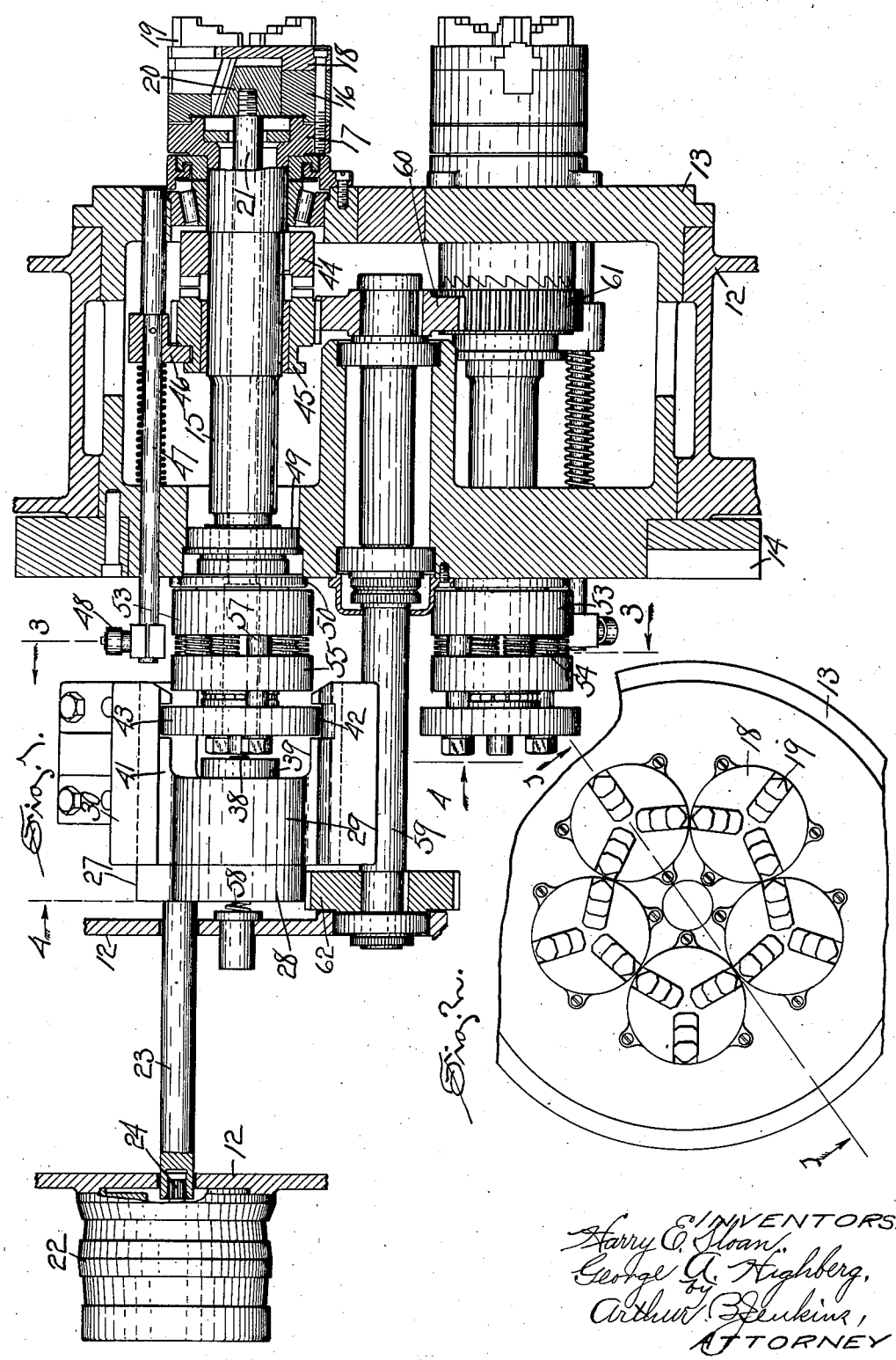
INVENTORS.
Harry E. Sloan,
George A. Highberg,
Arthur Jenkins,
by
ATTORNEY Jan. 9, 1940.  H. E. SLOAN ET AL  2,186,504
CHUCK OPERATING MECHANISM
Filed April 12, 1938   3 Sheets-Sheet 2
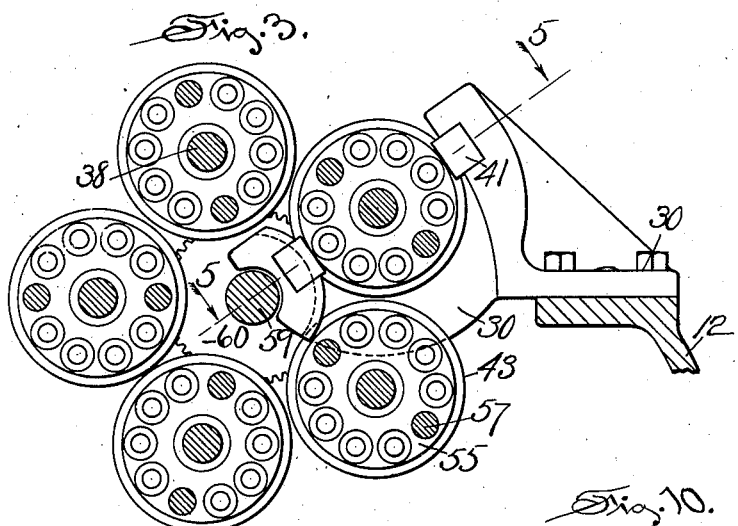
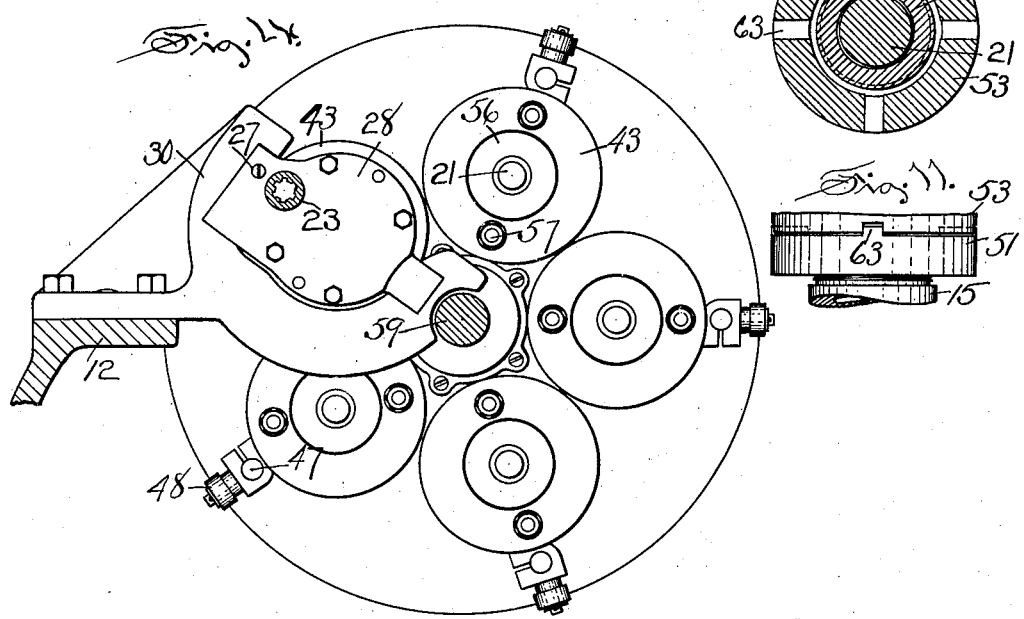

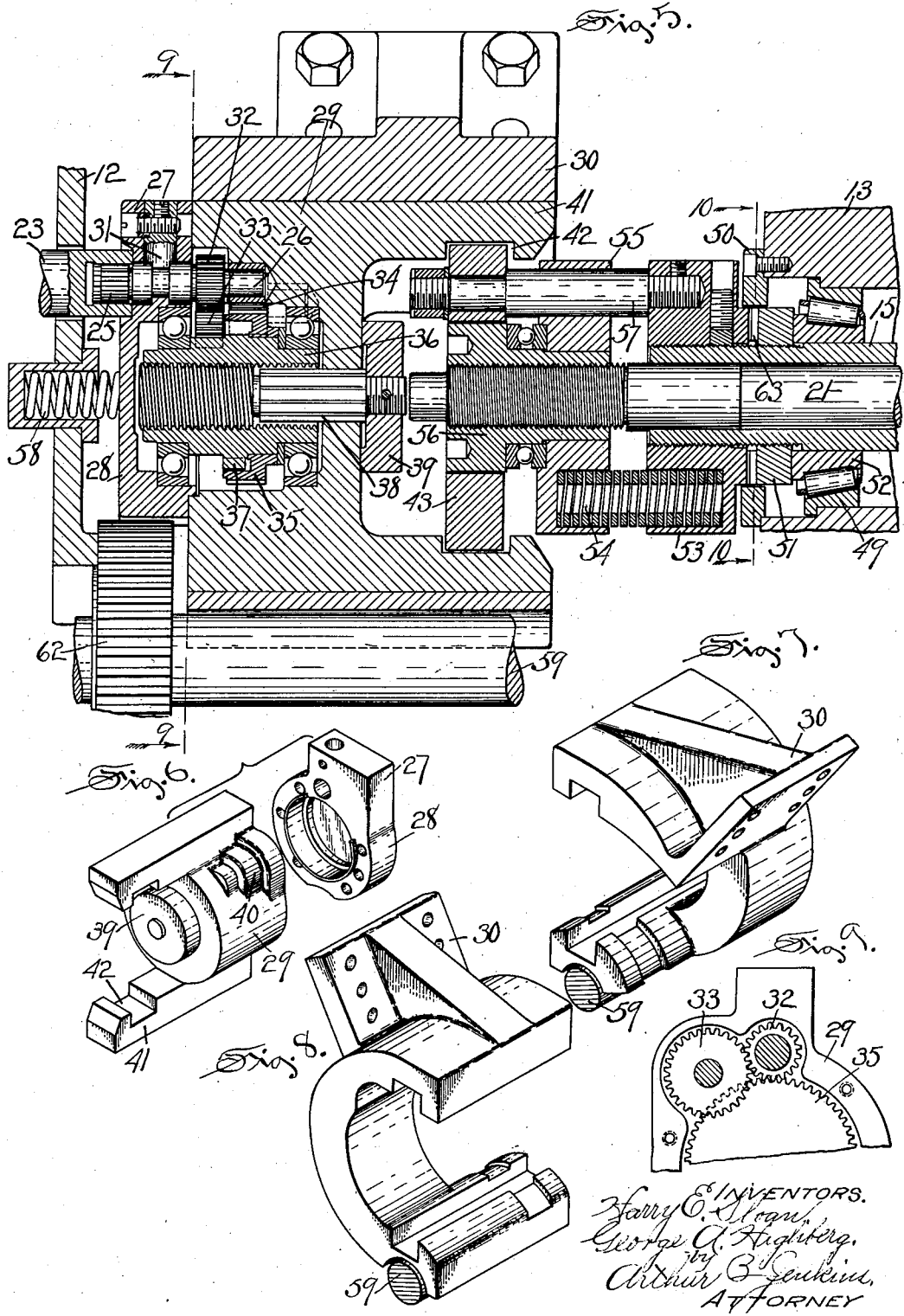

Patented Jan. 9, 1940

2,186,504

UNITED STATES PATENT OFFICE 2,186,504

CHUCK OPERATING MECHANISM

Harry E. Sloan, Hartford, and George A. Highberg, West Hartford, Conn., assignors to The Cushman Chuck Company, Hartford, Conn., a corporation of Connecticut Application April 12, 1938, Serial No. 201,498

14 Claims. (Cl. 29—38)

Our invention relates generally to mechanism for operating chuck clamping members and more especially to such clamping mechanism as embodied in that class of chucks comprising bodies having radially reciprocating jaws mounted upon the faces of the chucks, and an object of our invention, among others, is the production of an operating mechanism for chucks of this type that shall be strong and durable in construction and that may be operated in a simple and efficient manner; and a further object of the invention is the production of a chuck operating mechanism in the use of which there shall be little liability to injury by reason of excessive force encountered during operation.

One form of a chuck operating mechanism embodying our invention and in the construction and use of which the objects herein set out, as well as others, may be attained is illustrated in the accompanying drawings in which—

Figure 1 is a view in lengthwise section through a mechanism embodying our invention on a plane denoted by the dotted line 1—1 of Fig. 2.

Figure 2 is an end view looking from the right of the device as seen in Fig. 1, the edges being broken away.

Figure 3 is a view in section on a plane denoted by the dotted line 3—3 of Fig. 1.

Figure 4 is a view in cross section on a plane denoted by the dotted line 4—4 of Fig. 1.

Figure 5 is a view on enlarged scale in lengthwise section on a plane denoted by the dotted line 5—5 of Fig. 3.

Figure 6 is an isometric perspective disconnected view of disconnected parts of the chuck operating mechanism.

Figure 7 is a similar view of the supporting bracket.

Figure 8 is a similar view of the bracket looking from the opposite direction.

Figure 9 is a view in cross section on a part of the plane denoted by the dotted line 9—9 of Fig. 5.

Figure 10 is a similar view on a part of the plane denoted by the dotted line 10—10 of Fig. 5.

Figure 11 is an edge view of the roller bearing case and thrust nut and a portion of the spring seating disk.

Our improved chuck operating mechanism is particularly designed for use in connection with chucks which are movably mounted and which are successively brought into certain positions for the performance of operations on articles held by the chucks, and while the invention is not limited to any particular mechanism of this type we have illustrated it herein in connection with chucks mounted in a rotating turret as shown in the drawings herein in which the numeral 12 denotes the frame of the machine in which a turret 13 is rotatably mounted. The turret may be intermittently rotated in any well-known manner common to structures of this type, for instance, as by means of a Geneva movement one member 14 of which is illustrated in Fig. 1 of the drawings. As this will be readily understood by those skilled in the art, a further showing is omitted herein.

A number of chucks and the operating mechanism therefor are mounted in the turret and are revolved thereby to bring them into different positions required for operation upon articles held by the chucks and particularly into position for release of articles from the chuck jaws and the placing of other articles therein, this comprising an important feature of our invention. As all of the chucks and operating mechanism therefor are of the same construction a description of one only will be given, it being understood that such description will apply equally to all. Each chuck comprises a spindle 15 rotatably mounted in the turret and a chuck body 16 is secured to a flange 17 of the spindle in any suitable manner, screws being shown herein for this purpose. The chuck comprises a face plate 18 upon which chuck jaws 19 are mounted for radial movement. A chuck jaw actuating head 20 is mounted in the body and is operatively connected with the chuck jaws for opening and closing them as by means of an actuating rod 21. All of the parts thus far described are of old and well known construction, and except in combination with other parts to be hereinafter described, comprise no part of the present invention. The spindle 15 is shown herein as mounted upon roller bearings a description of which is omitted as not necessary to an understanding of the invention.

As before mentioned an important feature of our invention resides in the mechanism for opening and closing the chuck jaws to release articles therefrom and to receive them for clamping action thereon. This mechanism comprises a motor 22 supported in a fixed position on the frame of the machine, as shown in Fig. 1, and operatively connected with an actuating spindle 23 in any suitable manner, a pinion 24 being shown herein splined with an internal gear in a socket in the end of the spindle, as shown in Fig. 1 of the drawings. The motor is of any well-known reversible type which may be automatically or manually controlled in any suitable manner to rotate in opposite directions to effect opening and closing operations of the chuck jaws, these controlling means not being shown herein.

The end of the spindle 23 opposite to that end geared to the motor has a toothed socket within which a pinion 25 is located, said pinion being engaged for sliding movement with the teeth of the gear in said socket. The pinions 24—25 are meshed with the spindle 23 for sliding movement relatively thereto for a purpose to be hereinafter described.

The pinion 25 is rigid with an intermediate shaft 26 rotatably mounted in an extension 27 from the edge of a cap 28 secured to the end of a mount 29 supported in a bracket 30 secured to the frame 12, as shown in Figs. 3 and 4 of the drawings. The shaft 26 extends into a recess in the mount 29 and is held from endwise movement in said cap by the end of a stud 31 projecting into an annular groove in the shaft, as shown in Fig. 5. A pinion 32 secured to the shaft 26 meshes with a gear 33 fast with a pinion 34 rotatably mounted in the recess above mentioned in the mount 29, the pinion 34 meshing with a gear 35 loosely secured to a feed nut 36 mounted on ball bearings in the mount 29 and in the cap 28. The connection of the gear with the nut is by means of a lug 37 on the nut engaging a recess in the gear as shown in Fig. 5 of the drawings so that the gear has a limited movement independently of the nut before they engage, a blow being thereby imparted to the nut for the purpose of tightening or loosening the grip of the chuck jaws upon or from an article.

The nut 36 is screw threadedly engaged with an actuating plunger 38 passing through an opening in the mount 29 and splined for sliding movement in said opening. A disk 39 is secured to the end of the plunger.

The mount 29 has a bulbous projection 40 on one side within which the recess for the gears and pinions connecting the actuating spindle 23 with the feed nut 36 is located. Jaws 41 located on diametrically opposite sides of the mount 29 project from one end thereof, these jaws having notches 42 for the reception of a spring supporting disk 43 in a manner and for a purpose to be hereinafter described. A driven clutch member 44 is secured to the spindle 15 which is in the form of a sleeve, and a driving clutch member 45 is loosely mounted for sliding movement on said sleeve to engage with said member 44. The member 45 is engaged with and disengaged from the driven clutch member as by means of a fork 46 on a spring pressed clutch actuating-rod 47 mounted for sliding movement in the turret and bearing at its outer end a roller 48 adapted to engage with a stationary cam for operation of the clutch parts in a manner now to be described. This actuating cam is not shown herein as it is not necessary for a full understanding of the invention. It will be understood, however, that the fork 46 is engaged in an annular groove in the driving clutch member 45 and the roller 48 is engaged with its cam to cause separation of the clutch members at the proper time when operations upon the work have been completed and to permit such work to be removed and another piece substituted therefor. The clutch members are engaged by means of a spring encircling the rod 47, as shown in Fig. 1, the spring acting to cause engagement of the clutch members after a piece of work has been secured within the chuck jaws to be rotated thereby for operations of the tools thereon. The roller bearings for the rear end of the spindle 21 comprise a case 49 within which the rollers are located as shown in Fig. 5, the opening within which this case is located being closed by a cap 50 and an adjusting nut 51 being screw threadedly engaged with the sleeve of the spindle 15 for the purpose of adjusting the pressure to be received by the roller bearing cone 52. A seating disk 53 is screw threadedly engaged with the end of the sleeve 15 and has recesses to receive the ends of jaw closing springs 53. A spring compressing disk 55 is mounted on a spring compressing sleeve 56 screw threadedly engaged with the rear end of the chuck jaw actuating rod 21, ball bearings being located between said disk and sleeve as shown in Fig. 5 of the drawings. Sleeve supporting posts 57 are secured to the seating disk 53 and project through holes in the disk 55 to the opposite side of said disk where they are secured to the spring supporting disk 43. The operation of the mechanism is as follows.

It being assumed that the chuck jaws 19 are closed to grip a piece of work and the clutch memebrs 44 and 45 having been disengaged by contact of the roller 48 with its actuating cam as hereinbefore referred to the motor 22 will be started in any suitable manner as by means of a push button to close a switch. The actuating spindle 23 having thus been started the connecting pinions and gears between said spindle and feed nut 36 will rotate the latter, and the actuating plunger 38 will thereby be forced forward, exerting pressure upon the end of the chuck jaw actuating rod 21. This pressure will be resisted by the jaw closing springs 54 which have considerable compression resisting force, about seven thousand pounds as an example. As a result of this the pressure of the actuating plunger 38 against the chuck jaw actuating rod 21 will cause the mount 29 to be moved backwardly against the tension of the mount actuating spring 58 which is much weaker than the springs 54. This movement of the mount will move the jaws 41 to exert pressure against the supporting disk 43. Backward movement of the mount having been stopped by contact of the jaws 41 with the disk 43 continuation of the pressure of the actuating plunger 38 will force the chuck actuating rod 21 forward, thereby operating the head 20 to open the chuck jaws and this without causing any end thrust on the spindle 15 other than the thrust imparted by the spring 58.

Rotation of the motor is now stopped, as by operation of a push button, limit switch, or merely stalling of the motor. The piece of work just operated upon having been removed and a new piece inserted between the jaws the latter are closed by operation of the push button or other suitable device to rotate the motor in the opposite direction from that just described, whereupon action of the parts just above described will be reversed and the chuck jaws will be closed to grip said new piece. A one-step movement of the turret will take place to bring the next chuck into position for repetition of the operation just described. When the turret is moved to place a chuck in the position for releasing and reloading operations the disk 43 appurtenant to such chuck will enter by a sweeping movement into the notches 42, thereby placing the chuck in position for the operation just described.

The spindles or sleeves 15 are driven by means of a spindle driving shaft 59 having a gear 60 secured thereto and meshing with gears 61 secured to the several spindles, the gears 61 being revolved about the gear 60 in continual mesh therewith. A driving gear 62 secured to shaft 59 serves as a means for driving the latter from any suitable source of power, not shown herein.

As hereinbefore remarked in order to get a proper grip upon the jaws the springs 54 exert considerable force, and an important feature of our invention resides in the construction wherein this excessive force is not transferred to the sets of roller bearings for supporting the sleeve spindle. The seating disk 53 is secured to the sleeve and the disk 55 is rigidly connected with the rod 21. The springs 54 therefore exert their force in opposite directions upon the rod 21 and the sleeve 15, and these two members being connected by the chuck the forces are equalized and no force is therefore exerted by the springs against the sleeve to be transmitted to the bearings. For operation the adjusting nut 51 is employed to get the proper pressure between the members of the roller bearings, say three thousand pounds, and this pressure is maintained and is not affected by the seven thousand pounds pressure which may be exerted by the springs. Provision for a space between the nut 51 and the disk 53 is made, as shown in Figs. 10 and 11 of the drawings, to permit the adjusting movement of the nut 51, lugs 63 on one of said members, as the nut 51, engaging in grooves 64 in the other member, as the disk 53.

The members of the main roller bearings for the spindle having been adjusted as just described the nut 51, after such adjustment, is held against rotation which would disturb the adjustment by the engagement of the lug 63 thereon with the disk 53, the latter being secured against rotation by means of a set screw as shown in Fig. 5.

The tension of the jaw closing springs 54 may be readily adjusted by means of the spring clamp sleeve 56 which is screw threadedly engaged with the rod or draw bar 21, holes to receive a wrench for turning such sleeve being provided as shown in Fig. 5.

In accordance with the provisions of the patent statutes we have described the principles of operation of our invention together with the device which we now consider to represent the best embodiment thereof; but we desire to have it understood that the device shown is only illustrative and that the invention may be carried out by other means and applied to uses other than those above set out.

We claim:

1. A chuck actuating mechanism including a rotatably mounted spindle member and a chuck jaw actuating rod member independently movable one within the other, a chuck secured to one end of one of said members, chuck jaws movably mounted on said chuck and operatively connected with one end of the other of said members, a seating disk rigidly secured to one of said members, a spring compressing disk rigidly connected with the other of said members, a spring supporting disk independently of either of said members rigidly connected with said seating disk, means independent of said seating disk for resisting movement of said spring supporting disk, and means for actuating one of said members to operate said jaws independently of the other of said members.

2. A chuck jaw actuating mechanism including a rotatably mounted spindle, a chuck jaw actuating rod extending through and movable independently of said spindle, a chuck secured to said spindle, chuck jaws movably mounted on said chuck and operatively connected with one end of said rod, a seating disk rigidly secured to said spindle, a spring compressing disk rigidly connected with said rod, a spring supported between said disks to exert pressure in opposite directions thereon, a spring supporting disk rigidly connected with said seating disk independently of said spindle, means independent of said seating disk for obstructing movement of said spring supporting disk, and means for actuating said rod to operate said jaws independently of said spindle.

3. A chuck jaw actuating mechanism including a rotatably mounted spindle, a chuck jaw actuating rod extending through and movable independently of said spindle, a chuck secured to one end of said spindle, chuck jaws movably mounted on said chuck and operatively connected with one end of said rod, a spring seating disk rigidly secured to said spindle, a spring compressing sleeve secured to said rod, a spring compressing disk mounted on said sleeve, a spring supported between said seating and spring compressing disks to exert pressure in opposite directions thereon to operate said jaws, a spring supporting disk rigidly connected with said seating disk, means independent of said seating disk for resisting movement of said spring supporting disk, and means for operating said rod to operate said jaws independently of said spindle.

4. A chuck actuating mechanism including a rotatably mounted spindle, a chuck jaw actuating rod extending through said spindle and movable independently thereof, a chuck secured to one end of said spindle, chuck jaws movably mounted on said chuck and operatively connected with one end of said rod, a seating disk secured to said spindle, a spring compressing disk rigidly connected with said rod, a spring supported between said disks and exerting pressure in opposite directions thereon to operate said jaws, a post extending loosely through said spring compressing disk and secured at one end to said seating disk, a spring supporting disk secured to the opposite end of said post, a spring compressing sleeve secured to said post and rigidly connected with said spring compressing disk, and means for exerting pressure on said rod to operate said chuck jaws independently of said spindle.

5. A chuck jaw actuating mechanism including a rotatably mounted spindle, a chuck jaw actuating rod extending through said spindle and movable independently thereof, a chuck secured to one end of said spindle, chuck jaws movably mounted on said chuck and operatively connected with one end of said rod, spring actuated means operatively connected with said spindle and with said rod to exert pressure in opposite directions thereon for operation of said jaws, means for exerting pressure upon said rod to operate said jaws independently of said spring pressure, and means including a movably supported mount in which said pressure exerting means is carried for equalizing the pressure of said spring upon said spindle and rod during operation of the latter to operate said jaws.

6. A chuck jaw actuating mechanism including a rotatably mounted spindle, a chuck jaw actuating rod extending through said spindle and movable independently thereof, a chuck secured to one end of said spindle, chuck jaws movably mounted on said chuck and operatively connected with one end of said rod, spring actuated means operatively connected with said spindle and with said rod to exert pressure in opposite directions thereon for operation of said jaws, means for exerting pressure upon said rod to operate said jaws independently of said spring pressure, and means for equalizing the pressure of said spring upon said rod and upon said spindle, said means including a spring supporting disk, a movably supported mount in which said pressure exerting means is carried, and means movable with said mount to engage said disk to resist pressure of said spring.

7. A chuck jaw actuating mechanism including a rotatably mounted spindle member and a chuck jaw actuating member independently movable one within the other, a chuck secured to one end of one of said members, chuck jaws movably mounted on said chuck and operatively connected with one end of the other of said members, a seating disk secured to one of said members, a spring compressing disk rigidly connected with the other of said members, a spring supported between said members to exert spring pressure in opposite directions thereon to actuate said jaws, an adjusting sleeve screw threadedly engaged with one of said members and thrusting against one of said disks to adjust the tension of said springs, and means for actuating one of said members to operate said jaws independently of said spring actuated means.

8. A chuck actuating mechanism including a rotatably mounted spindle, a chuck jaw actuating rod extending through said spindle and movable independently thereof, a chuck secured to one end of said spindle, chuck jaws movably mounted on said chuck and operatively connected with one end of said rod, a seating disk secured to said spindle, a spring compressing disk rigidly connected with said rod, a spring supported between said disks and exerting pressure in opposite directions thereon to operate said jaws, a post extending loosely through said spring compressing disk and secured at one end to said seating disk, a spring supporting disk secured to the opposite end of said post, and means for exerting pressure on said rod to operate said chuck jaws independently of said spindle.

9. A chuck jaw actuating mechanism including a rotatably mounted spindle, a chuck jaw actuating rod extending through said spindle and movable independently thereof, a chuck secured to one end of said spindle, chuck jaws movably mounted on said chuck and operatively connected with one end of said rod, spring actuated means operatively connected with said spindle and with said rod to exert pressure in opposite directions thereon for operation of said jaws, means for exerting pressure upon said rod independently of said spring pressure to operate said jaws, means including a movably supported mount in which said pressure exerting means is carried, and means for connecting the mount with one end of said spindle to resist pressure of said spring thereon and for equalizing the pressure of said spring upon said spindle during the operation of the latter to operate the jaws.

10. A chuck jaw actuating mechanism including a rotatably mounted spindle, a chuck jaw operating rod mounted within the spindle and independently movable therein, a chuck secured to said spindle, chuck jaws movably mounted on said chuck and operatively connected with one end of said operating rod, a slidably supported mount, spring supporting disks secured one to said spindle and the other rigid with said rod, means to connect said mount with the spindle to resist spring pressure thereon, an actuating plunger supported in said mount to contact with the end of said rod, a motor supported independently of said mount, a feed nut rotatably supported by said mount and threadedly engaged with said actuating plunger, and a geared connection operatively supported by said mount to connect said motor and said feed nut for operation of said actuating plunger.

11. A chuck actuating mechanism including a rotatably mounted spindle member and a chuck jaw actuating rod member independently movable one within the other, a chuck secured to one end of one of said members, chuck jaws movably mounted on said chuck and operatively connected with one end of the other of said members, a seating disk rigidly secured to one of said members, a spring comprising disk rigidly connected with the other of said members, a spring supporting disk rigidly connected with said seating disk independently of either of said members, a bodily movable support engageable with said spring supporting disk, and a force applying means carried by said movable support and engageable with one of said members, whereby said members are forced in opposite directions to tension said springs.

12. A chuck jaw actuating mechanism including a rotatably mounted spindle, a chuck jaw actuating rod extending through and movable independently of said spindle, a chuck secured to said spindle, chuck jaws movably mounted on said chuck and operatively connected with one end of said rod, a seating disk rigidly secured to said spindle, a spring compressing disk rigidly connected with said rod, a spring supported between said disks to exert pressure in opposite directions thereon, a spring supporting disk rigidly connected with said seating disk independently of said spindle, a bodily movable support engageable with said spring supporting disk, and a force applying means carried by said movable support and engageable with one of said members, whereby said members are forced in opposite directions to tension said springs.

13. A chuck jaw actuating mechanism including a rotatably mounted spindle, a chuck jaw actuating rod extending through and movable independently of said spindle, a chuck secured to one end of said spindle, chuck jaws movably mounted on said chuck and operatively connected with one end of said rod, a spring seating disk rigidly secured to said spindle, a spring compressing sleeve secured to said spindle, a spring compressing disk mounted on said sleeve, a spring supported between said seating and spring compressing disks to exert pressure in opposite directions thereon to operate said jaws, a spring supporting disk rigidly connected with said seating disk, a bodily movable support engageable with said spring supporting disk, and a force applying means carried by said movable support and engageable with one of said members, whereby said members are forced in opposite directions to tension said springs.

14. A chuck jaw actuating mechanism including a rotatably mounted spindle and a chuck jaw actuating rod independently movable one within the other, a chuck secured to one of said members, chuck jaws movably mounted on said chuck and operatively connected with one end of the other of said members, springs operatively connected at their opposite ends with each of said members, means for effecting pressure of said springs in opposite directions upon both of said members whereby said chuck jaws are operated, means for exerting force upon one of said members to compress said springs, and antifriction bearings for supporting said spindle.

HARRY E. SLOAN.
GEORGE A. HIGHBERG.